(12) United States Patent
Leymann et al.

(10) Patent No.: US 7,403,878 B2
(45) Date of Patent: Jul. 22, 2008

(54) USING NODES FOR REPRESENTING HYPER-EDGES IN PROCESS MODELS

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 805 days.

(21) Appl. No.: 10/265,940

(22) Filed: Oct. 7, 2002

(65) Prior Publication Data
US 2003/0079200 A1 Apr. 24, 2003

(30) Foreign Application Priority Data
Oct. 18, 2001 (DE) .................................. 01124851

(51) Int. Cl.
*G06F 7/60* (2006.01)
*G06F 17/10* (2006.01)

(52) U.S. Cl. ............................................... 703/2
(58) Field of Classification Search ............... 703/2
See application file for complete search history.

(56) References Cited

U.S. PATENT DOCUMENTS

| | | | | |
|---|---|---|---|---|
| 6,009,405 A | * | 12/1999 | Leymann et al. | 705/9 |
| 6,065,009 A | * | 5/2000 | Leymann et al. | 707/10 |
| 6,073,111 A | * | 6/2000 | Leymann et al. | 705/8 |
| 6,278,977 B1 | * | 8/2001 | Agrawal et al. | 705/7 |
| 6,631,354 B1 | * | 10/2003 | Leymann et al. | 705/8 |
| 2002/0026297 A1 | * | 2/2002 | Leymann et al. | 703/1 |
| 2002/0111841 A1 | * | 8/2002 | Leymann et al. | 705/7 |
| 2006/0274070 A1 | * | 12/2006 | Herman et al. | 345/474 |
| 2007/0021995 A1 | * | 1/2007 | Toklu et al. | 705/7 |
| 2007/0055557 A1 | * | 3/2007 | Kloppmann et al. | 705/7 |

* cited by examiner

*Primary Examiner*—Kamini Shah
*Assistant Examiner*—David Silver
(74) *Attorney, Agent, or Firm*—Bruce Clay; Hoffman Warnick LLC

(57) ABSTRACT

The current invention relates to a definition of a process model in a Workflow Management System or a computer system with comparable functionality (WFMS) wherein said process model is modeling at least one hyper-edge said hyper-edge representing a boundary within said process model. According to the current invention the process model is realized by defining said hyper-edge by one or a multitude of additional hyper-edge nodes being part of said process model.

8 Claims, 5 Drawing Sheets

USING NODES FOR REPRESENTING HYPER-EDGES IN PROCESS MODELS

BACKGROUND OF THE INVENTION

The present invention relates to a technology for the representation of hyper-edges in a graph-oriented process meta model of a Workflow-Management-Systems or a computer system with comparable functionality (WFMS).

Workflow-Management-Systems (WFMS) support the definition and execution of business processes. Business processes executed within a WFMS environment control who will perform which piece of work of a network of pieces of work and which resources are exploited for this work. The individual pieces of work might be distributed across a multitude of different computer systems connected by some type of network.

Such WFMS implement a particular meta model for modeling business processes. The most prominent meta model is the graph-oriented process meta model, implemented for example by IBM MQSeries Workflow. It supports the modeling of business processes as a network of activities. This network of activities, the process model, is constructed as a directed, acrylic, weighted, colored graph. The nodes of the graph represent the activities, which are performed. The edges of the graph, the control connectors, describe the potential sequence of execution of the activities. Definition of the process graph is via IBM MQSeries Workflow's Flow Definition Language (FDL) or via the built-in graphical editor. The runtime component of the Workflow-Management-System uses said process model as a template to create process instances.

Different meta models for modeling of business processes have been developed within the state of the art though it finally turned out that the graph-oriented meta model is the most expressive one providing the richest set of modeling constructs. This fact created the problem that some modeling constructs, which are available within the graph-oriented meta model, cannot be translated to other WFMS meta models. Especially the modeling construct of a so-called sphere, could not be translated satisfactory in a workable implementation within other WFMS meta models. Spheres are defined as a set of activities within the process model, that means a sub-graph of the process model. Spheres are modeling constructs to establish a common context or goal for the individual activities within said sphere.

Thus there is a need in the state of the art for providing realizations of advanced modeling constructs within WFMS meta models which maybe realized in almost any WFMS.

OBJECTIVE OF THE INVENTION

The objective of the invention is to provide a technology for defining advanced WFMS modeling constructs within WFMS meta models which maybe realized in almost any WFMS.

SUMMARY OF THE INVENTION

The objectives of the invention are solved by the independent claims. Further advantageous arrangements and embodiments of the invention are set forth in the respective subclaims.

The current invention relates to a definition of a process model in a Workflow Management System or a computer system with comparable functionality (WFMS) wherein said process model is comprising at least one hyper-edge said hyper-edge representing a boundary within said process model. According to the current invention the process model is realized by defining said hyper-edge by one or a multitude of additional hyper-edge nodes being part of said process model.

If in the process model a control flow, directed from a first activity to a second activity, is intersecting said hyper-edge, then according to a further embodiment of the current invention the hyper-edge is defined by a hyper-edge node and the control flow is defined by a first control connector directed from the first activity to the hyper-edge node and a second control connector directed from the hyper-edge node to the second activity.

The most important advantage of the current teaching is that the invention allows the definition of the notion of hyper edges (or spheres) without requiring specific modeling constructs requiring only modeling constructs which are available within any WFMS. The only modeling constructs being required are those of activities and connectors. Thus the current invention enables the definition of advanced WFMS features within almost any WFMS without requiring specific modeling constructs.

DETAILED DESCRIPTION OF THE PREFERRED EMBODIMENT

Figure 1:
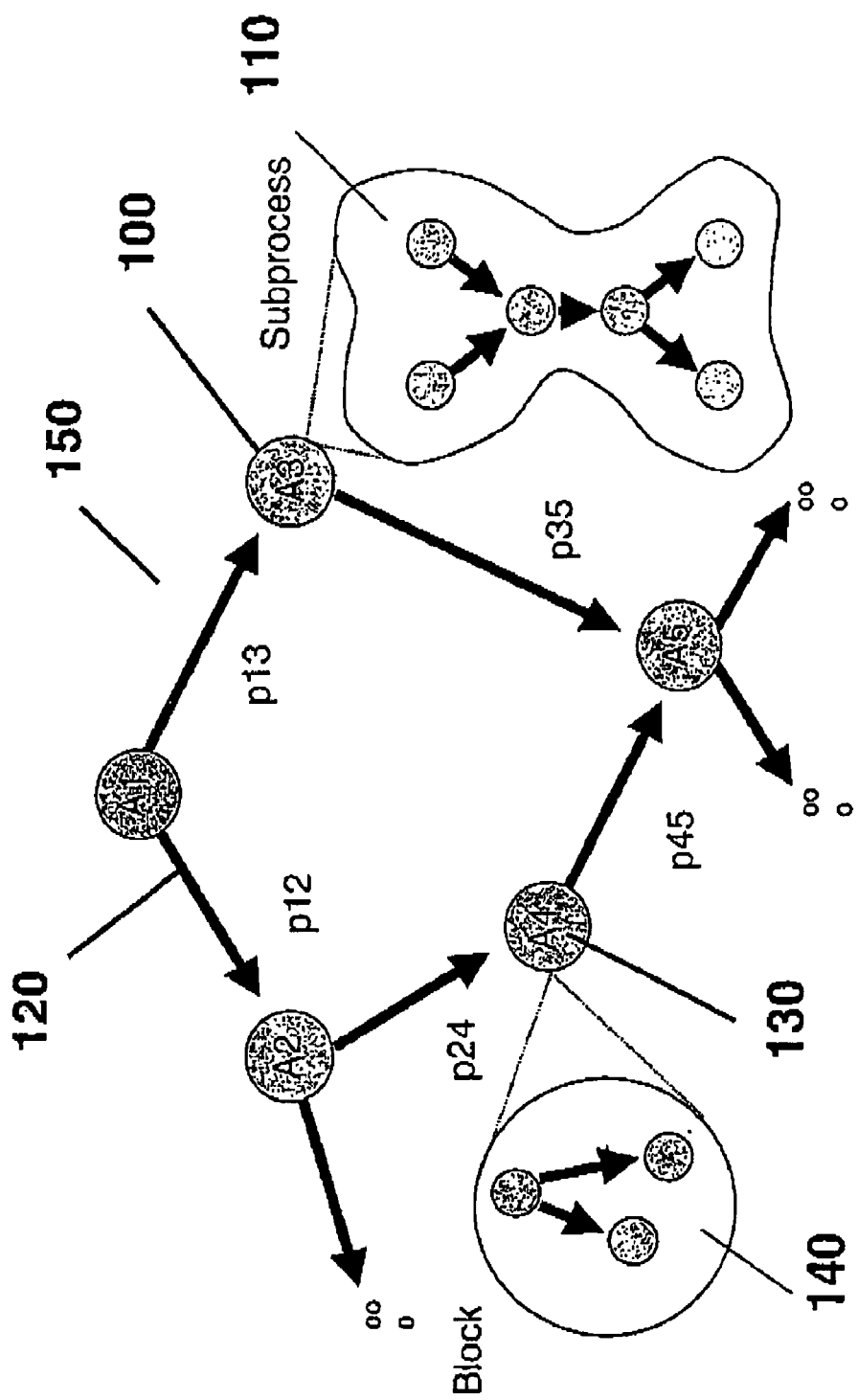
FIG. 1 shows a business process model using a graph-oriented flow meta model according to the state of the art.

In the drawings and specification there has been set forth a preferred embodiment of the invention and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when being loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The current invention is illustrated based on the meta model that is implemented by IBM's "MQSeries Workflow" workflow management system. Of course any other WFMS could be used instead. Furthermore the current teaching applies also to any other type of system, which offers WFMS functionalities not as a separate WFMS but within some other type of system.

The following is a short outline on the basic concepts of a workflow management system based on IBM's "MQSeries Workflow" WFMS:

From an enterprise point of view the management of business processes is becoming increasingly important: business processes or process for short control which piece of work will be performed by whom and which resources are exploited for this work, i.e. a business process describes how an enterprise will achieve its business goals. A WFMS may support both, the modeling of business processes and their execution.

Modeling of a business process as a syntactical unit in a way that is directly supported by a software system is extremely desirable. Moreover, the software system can also work as an interpreter basically getting as input such a model: The model, called a process model or workflow model, can then be instantiated and the individual sequence of work steps depending on the context of the instantiation of the model can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMS facilitates the management of business processes. It provides a means to describe models of business processes (build time) and it drives business processes based on an associated model (runtime). The meta model of IBM's WFMS MQSeries Workflow, i.e. the syntactical elements provided for describing business process models, and the meaning and interpretation of these syntactical elements, is described next.

It should however also be noted that process graphs are the typical way of representing business processes in all of these approaches. This gives rise to a first observation: if advanced WFMS modeling constructs within WFMS meta models can be defined by making use of standard process graphs only then it can be assumed that such advanced modeling construct maybe realized in almost any WFMS.

In MQSeries business processes are modeled as direct, acrylic, colored, and weighted graphs. The nodes of the graph represent the activities that need to be carried out and the edges of the graph the control connectors that describe the potential sequence in which the activities are to be carried out. Thus a process model is a complete representation of a business process, comprising a process diagram and the settings that define the logic behind the components of the diagram. Important components of an MQSeries Workflow process model are:

Processes
Activities
Blocks
Control Flows
Connectors
Data Containers
Data Structures
Conditions
Programs
Staff Not all of these elements will be described below.

Activities are the fundamental elements of the meta model. An activity represents a business action that is from a certain perspective a semantic entity of its own.

A MQSeries Workflow process model consists of the following types of activities:

Program activity: Has a program assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities.

Process activity: Has a (sub-)process assigned to perform it. The process is invoked when the activity is started. A process activity represents a way to reuse a set of activities that are common to different processes. Output from the process, can be used in the exit condition for the process activity and for the transition conditions to other activities.

The flow of control, i.e. the control flow through a running process determines the sequence in which activities are executed. The 'MQSeries Workflow' workflow manager navigates a path through the process that is determined by the evaluation to TRUE of start conditions, exit conditions, and transition conditions.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Control connectors model the potential flow of control within a business process model. Default connectors specify where control should flow when the transition condition of no other control connector leaving an activity evaluates to TRUE. Default connectors enable the workflow model to cope with exceptional events. Data connectors specify the flow of data in a workflow model. A data connector originates from an activity or a block, and has an activity or a block as its target. One can specify that output data is to go to one target or to multiple targets. A target can have more than one incoming data connector.

Process definition includes modeling of activities, control connectors between the activities, input/output container, and data connectors. A process is represented as a directed acyclic graph with the activities as nodes and the control/data connectors as the edges of the graph. The graph is manipulated via a built-in graphic editor. The data containers are specified as named data structures. These data structures themselves are specified via the DataStructureDefinition facility. Program activities are implemented through programs. The programs are registered via the Program Definition facility. Blocks contain the same constructs as processes, such as activities, control connectors etc. They are however not named and have their own exit condition. If the exit condition is not met, the block is started again. The block thus implements a Do Until construct. Process activities are implemented as processes. These subprocesses are defined separately as regular, named processes with all its usual properties. Process activities offer great flexibility for process definition. It not only allows to construct a process through permanent refinement of activities into program and process activities (top-down), but also to build a process out of a set of existing processes (bottom-up).

All programs, which implement program activities, are defined via the Program Registration Facility. Registered for each program is the name of the program, its location, and the invocation string. The invocation string consists of the program name and the command string passed to the program.

As an example of such a process model FIG. 1 shows schematically the structure of such a process graph. Activities (A1 up to A5) are represented as named circles; the name typically describes the purpose of the activity. Activities come in various flavors to address the different tasks that may need to be performed. They may have different activity implementations to meet these diverse needs. Program activities are performed by an assigned program, process activities like for instance 100 are performed by another process 110, and blocks like for instance 130 implement a macro 140 with a built-in do-until loop. Control connectors p12, p13, p24, p35, p45 are represented as arrows; the head of the arrow describes the direction in which the flow of control is moving through the process. The activity where the control connector starts is called the source activity; where it ends is called the target activity. When more than one control connector leaves an activity, this indicates potentially parallel work.

In general the activities, for example 100, 130, describe the tasks to be performed, and the control connectors, for example 120 describe the potential sequence in which the activities are to be carried out. Control connectors are associated with transition conditions, for example 150; a control connector is only followed if the transition condition (arbitrary complex Boolean predicates) evaluates to TRUE.

A set of activities, that means a sub-graph of the process model, is called a sphere. In specific situations a sphere also may comprise the complete graph of process model. A sphere establishes a common context or goal for the individual activities. Various types of spheres within process models are possible like for instance:

Atomic spheres group a set of transactional activities (in fact activity implementations) into a new transaction. This new transaction is managed by the workflow management system with the help of a transaction manager. When the transaction needs to be aborted, the workflow management system indicates to the transaction manager to abort the transaction; the transaction manager in turn requests the individual activity implementations cancel their work.

Performance spheres indicate to the workflow management system to carry out the enclosed activities in a certain time and an appropriate priority. The workflow management system would adjust the priorities of the underlying software (in general whatever execution environment is affected), such as operating system, database management system, or message queuing system to achieve the specified goal, such as running a performance sphere is less than 2 seconds.

Compensation spheres group a set of non-transactional activities into an overall transaction. When the transaction needs to be aborted, the workflow management system runs compensation activities to undo the effects of the originally executed activities.

Other types of spheres could establish a common security context or a data-sharing context, or a context for exception handling or a common context for recovery and the like.

Figure 2:
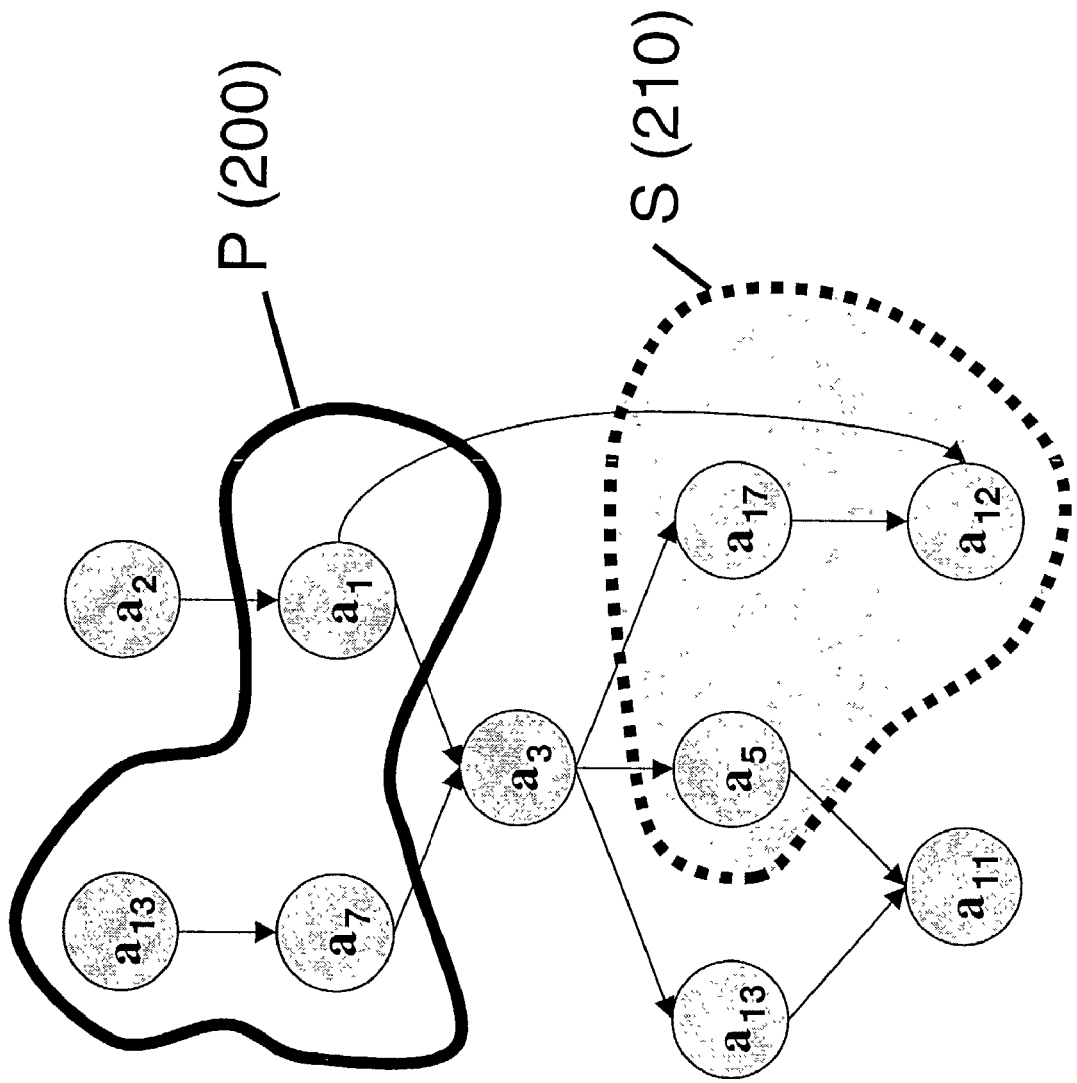
FIG. 2 depicts a simple example of a process model comprising two spheres for which an alternate realization implementable within any WFMS has to be found.

FIG. 2 depicts an example illustrating that spheres 200 and 210 are drawn as (closed) hyper edges in the graph-oriented process model graph; these spheres are accompanied by corresponding advanced WFMS modeling constructs provided by the graph-oriented process meta model. For example, sphere P(200) comprises activities, $a_1$, $a_7$, and $a_{13}$. Similarly, sphere S(210) comprises activities $a_5$, $a_{12}$, and $a_{17}$. The graph-oriented process model graph further includes activities $a_2$, $a_3$, $a_{13}$, and $a_{11}$ which reside outside of spheres 200 and 210. Hyper edges can be understood as additional boundaries within a process model. In most cases the boundary would separate a process model into at least two parts; but there also exist technically motivated situations in which this is not the case. If such a boundary is "closed" the hyper edge represents a sphere. Spheres are either impermeable or permeable. If a sphere, for example P (200), is impermeable, indicated via a solid line, the flow is halted by the WFMS along independent paths until all paths reached the boundary. In case of a permeable sphere, for example S (210), indicated via a dotted line, the flow does not halt when a particular path is ready to leave the sphere.

Permeability or impermeability of a sphere may further be distinguished whether it relates to incoming or outgoing control connectors.

As already addressed above different meta models for modeling of business processes have been developed within the state of the art though it finally turned out that the graph-oriented meta model is the most expressive one providing the richest set of modeling constructs. This fact created the problem that some modeling constructs, which are available within the graph-oriented meta model, cannot be translated to other WFMS meta models. To cope with these problems the current invention provides a teaching to define the advanced WFMS modeling construct of a sphere, or in general the modeling construct of a hyper edge (representing a boundary within the process model—in standard situations this boundary may separate the process model into at least two parts though there are technically motivated situations wherein this is not the case), within a WFMS which provides only the basic modeling constructs of an activity (node) and control flow (connector). If such a definition is available then the concept of a hyper edge can be realized in almost every WFMS.

While in the current teaching may be applied to any hyper edge situation the following description concentrates on the example of a definition of spheres.

The important idea of the current invention resides in the fact to define a hyper edge by one or a multitude of additional nodes, called hyper edge nodes, enhancing a process model. Whenever in a graph-oriented WFMS meta model a hyper edge would intersect the control flow between a first and a second activity the process model is adapted in the following ways (avoiding a specific modeling construct for hyper edges):

1. an additional hyper edge node is included at the point of intersection;
2. the control flow(between the first and second node) is defined by a first control connector directed from the first activity to the hyper-edge node and a second control connector directed from the hyper-edge node to the second activity.

Thus the current invention supports the definition of different representations of spheres (or hyper edges in general); in a graphical-based process meta model spheres may be defined based on specific modeling constructs, in other process meta models these specific modeling constructs can be replaced by special sphere nodes. The sphere nodes can be wired as any other activities; that means control connectors can be drawn to and drawn from a sphere node.

Figure 3:
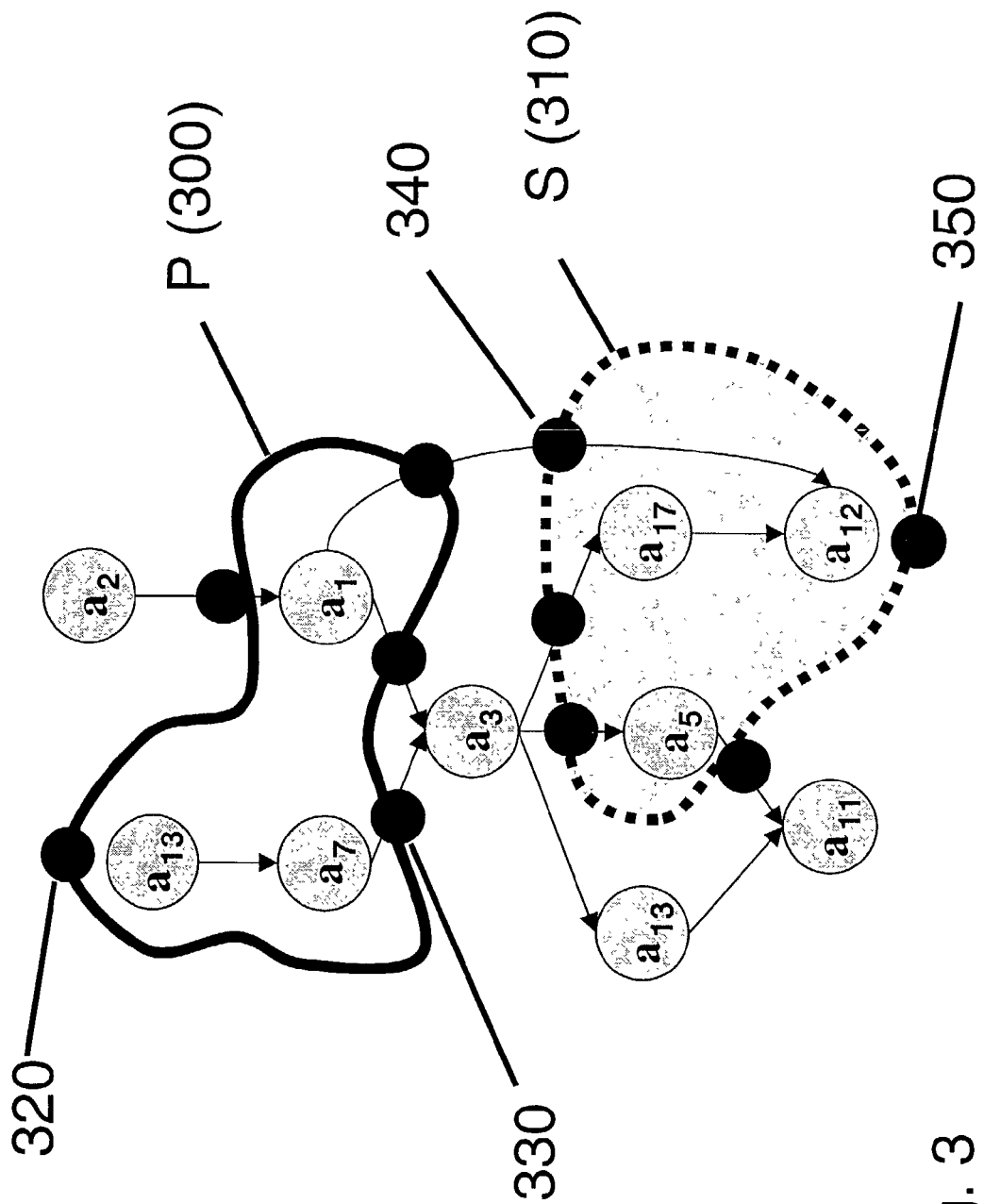
FIG. 3 shows how the simple example process model can be defined within any WFMS if in accordance with the current teaching so-called additional sphere nodes are being introduced within the process model replacing the sphere definition constructs of the graph-oriented meta model.

FIG. 3 illustrates how instead of using the specific modeling construct of a sphere (as a specific case of the general concept of hyper edges), explicit sphere nodes (or hyper edge nodes in general) can be used to signal entry into and exit from a given sphere. FIG. 3 visualizes how the example of FIG. 2 can be defined without the specific modeling construct of a sphere by using the proposed sphere node concept. The spheres 300 and 310 no longer have a modeling character; these boundaries are visualized only for the purpose of correspondence with the example of FIG. 2.

Sphere nodes (begin and end nodes) are added according to the following rules:

A Begin node where an edge enters the sphere, for example 340.

An End node where an edge leaves a sphere, for example 330.

A Begin node when an activity within a sphere has no edge leading to it, for example 320. This feature allows the WFMS at runtime to make the sphere "Ready" when the control flow approaches the sphere.

An End node when an activity within a sphere has no edge leaving it, for example 350. This feature allows the WFMS at runtime to terminate the sphere processing when the control flow leaves the sphere.

Thus, the sphere is defined by the additional nodes which are visualized as black bullets within FIG. 3.

These sphere nodes are associated exactly with these properties that specify sphere properties, for example to assign a sphere the atomic properties (in case the sphere represents an atomic sphere). One of the properties is the Halt property for impermeable spheres; for example the end node 330 needs to have this property, as the sphere P (300) is a non-permeable sphere.

Figure 4:
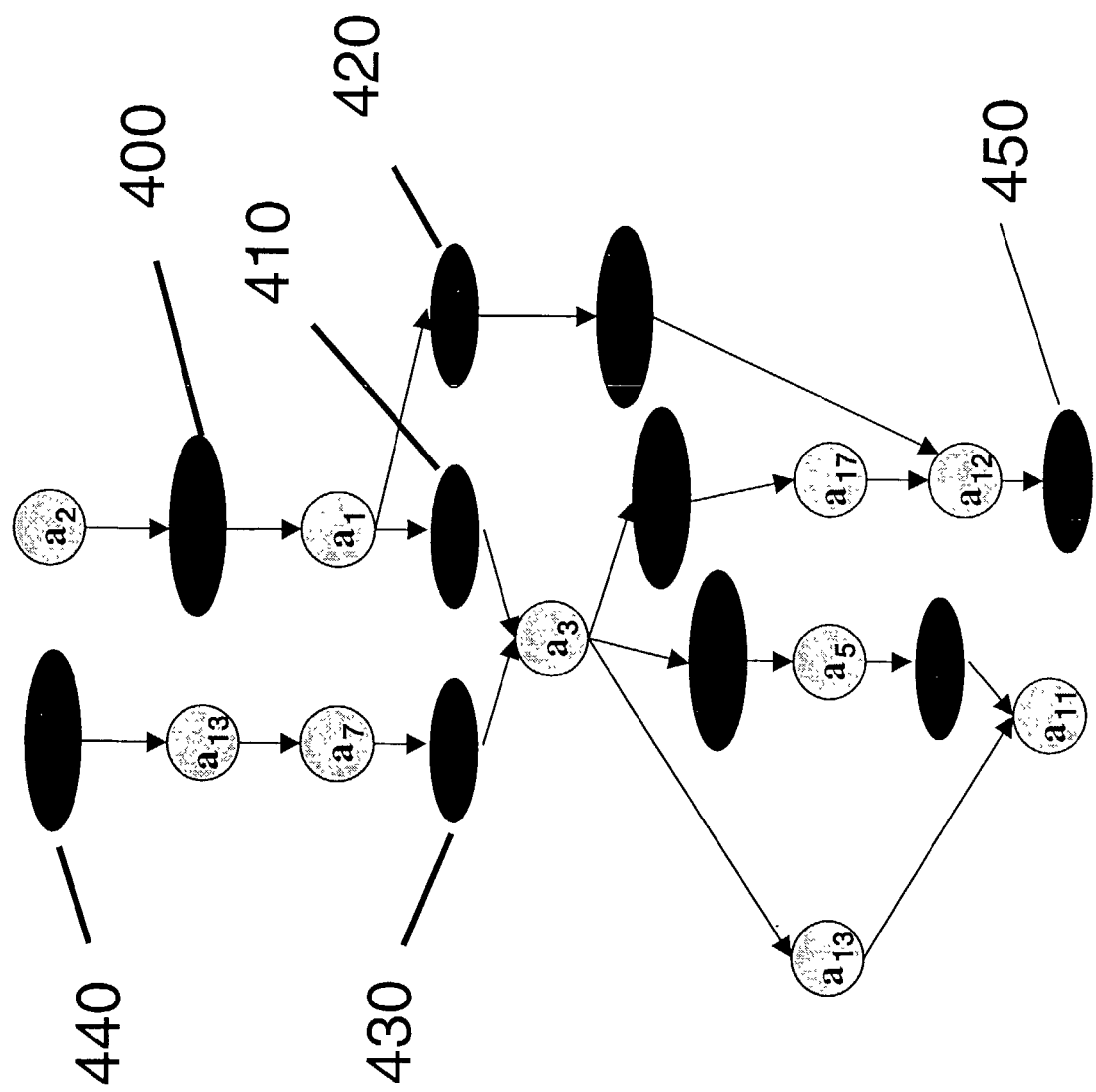
FIG. 4 visualizes the definition of spheres (based on above simple example process model) without a specific sphere modeling construct just by introduction of additional sphere nodes; this shows the equivalence of sphere definition constructs with the proposed approach of introducing additional sphere nodes.

The created sphere nodes are subject to wiring (that is connecting with control connectors) in the same way as normal activities are connected via control connectors. Applying the rules of determining the sphere nodes and wiring them accordingly, finally results in the model shown in FIG. 4. Within FIG. 4 the oval nodes represent the additional sphere node to represent a sphere without specific modeling constructs. Moreover all control connectors required to define a sphere are visualized also. Thus, for example, sphere nodes 400, 410, 420 and 420 aid in defining sphere P(300) from FIG. 3. Similar sphere nodes aid in defining sphere (S(310) from FIG. 3. Specific attention is also drawn to the sphere node 440 which now is connected with a control connector targeting to node a13 which originally had no control connector leading to it (compare for instance with FIG. 2). Further attention is given to node a12 which originally had no outgoing control connectors but which now is wired with the sphere node 450.

Figure 5:
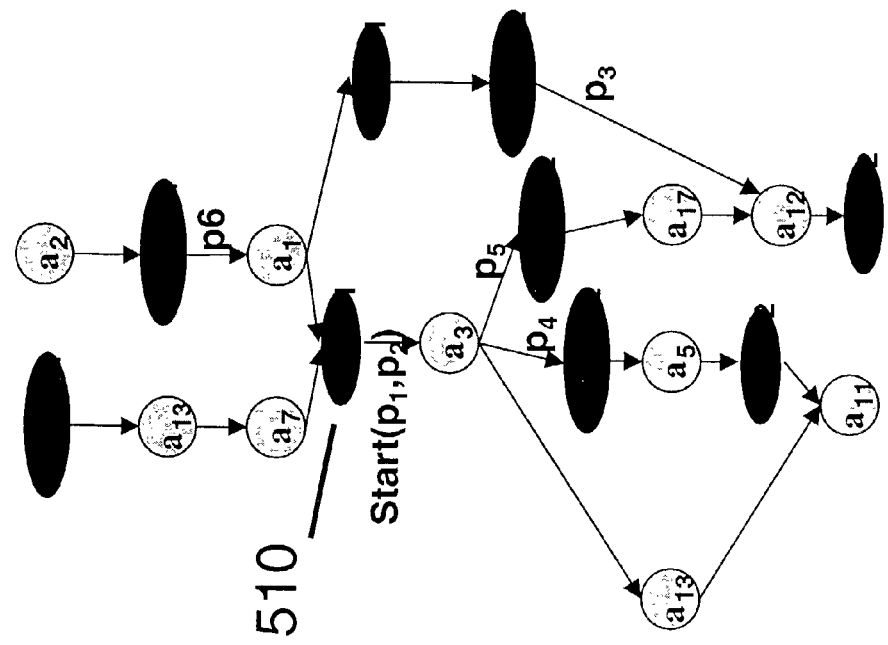
FIG. 5 illustrates that the number of sphere nodes can be reduced again in an optimization process to define a simplified process model.
Figure 5:
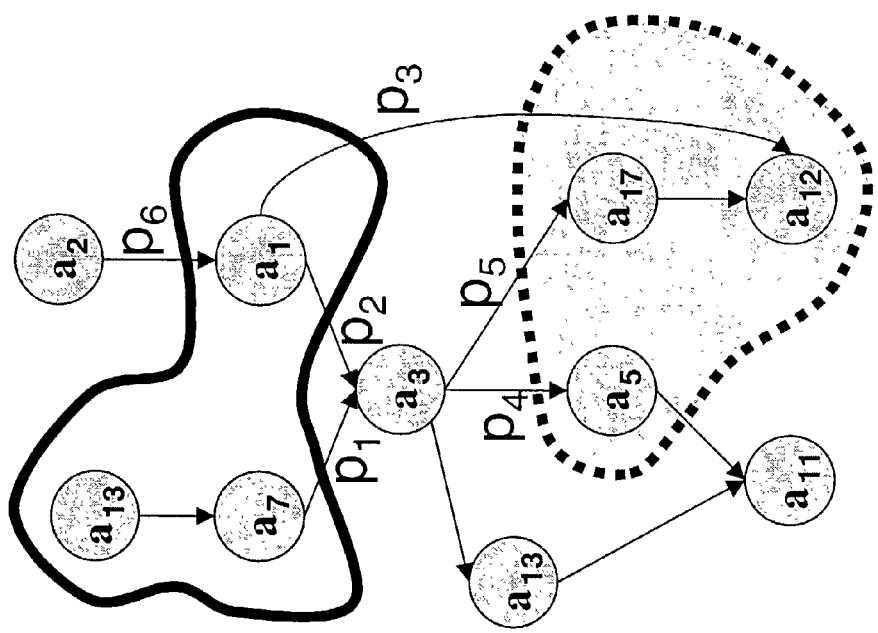

FIG. 5 illustrates that the number of sphere nodes can be reduced again in an optimization process to define a simplified process model. The left side of FIG. 5 reflects an example process model comprising (closed) hyper edges exploiting specific modeling construct. The process model includes, amongst others, control connectors p1, p2, p4, p4, p5, and p6. Whereas the right side of FIG. 5 reflects the same example process model now defining the notion of the hyper edges without exploitation of specific modeling constructs only using the concepts of activities and connectors. As can be seen from FIG. 5 also each of the representations could be generated automatically by a computerized procedure from the other representation. For the optimization purpose the constructed graph comprising the additional sphere nodes can be simplified again by combining certain ones of the introduced sphere of nodes. For instance the sphere nodes 410 and 430 of FIG. 4 can be combined into the single sphere node 510 of FIG. 5. Performing this graph simplification requires the rewriting of transition conditions and possibly other constructs, such as exit conditions. Stated in general terms the reduction process could be described as follows assuming that a first and a second activity are connected by a control flow intersecting with the sphere: whenever the enhanced process model comprises at least a third activity with an additional control flow directed from the third activity to the second activity and the additional control flow is intersecting the sphere (or in general the hyper-edge), the hyper-edge is defined by a common sphere (or in general hyper-edge) node for the control flow from the first activity to the second activity and the control flow from the at least third activity to the second activity.

The proposed alternate definition of hyper edges has several advantages over the representation using specific modeling constructs.

Process models defining the notion of hyper edges according to the current invention can be easier constructed via visual tools as the creation and definition of spheres is rather cumbersome. Moreover it turned out that with the proposed definition it is easier for people to comprehend the structure of spheres/hyper edges. It is further important to note that the proposed definition can be easier mapped to a language that underlies the process meta model, and which is the technical representation for the processing used by WFMS.

In addition to these benefits as a most important advantage of the current teaching, it has to be mentioned that the invention allows the definition of the notion of hyper edges (or spheres) without requiring specific modeling constructs requiring only modeling constructs which are available within any WFMS. The only modeling constructs being required are those of activities and connectors.

The current teaching may also be applied to complex situations like nested spheres or intersected spheres, proving the flexibility of the invention.

What is claimed:

1. A method of preparing a graph-oriented process meta model in a first workflow management system (WFMS) for translation to a second workflow management system (WFMS):

providing a graph-oriented process meta model on a computer-readable medium, the model comprising:
a plurality of activity nodes, wherein each activity node represents an activity;
at least one control connector, wherein each control connector represents a potential sequence of execution of the activities; and
at least one sphere, wherein each sphere represents a subset of the plurality of activities that are a sub-graph of the model;

changing the graph-oriented process meta model by representing a location of the sphere by adding sphere nodes according to a set of rules comprising:
placing a begin sphere node where an edge enters the sphere;
placing an end sphere node where an edge leaves the sphere;
placing a begin sphere node when an activity within the sphere has no edge leading to it; and
placing an end sphere node when an activity within a sphere has no edge leaving it; and providing the changed graph-oriented process meta model on a computer-readable medium, wherein the meta model only uses activities and connectors.

2. A process model according to claim 1, wherein said sphere is a hyper-edge, wherein said hyper-edge is associated with a property of being impermeable for all control flows intersecting said hyper-edge from one side of the hyper-edge, whereby said property of being impermeable is interpreted by the WFMS at run time when executing said process model to halt all control flows intersecting said hyper-edge from said one side in corresponding hyper-edge nodes until all said corresponding hyper-edge nodes are ready to proceed.

3. A process model according to claim 1, wherein said sphere is a hyper-edge, wherein said hyper-edge is associated with a property of being permeable for all control flows intersecting said hyper-edge from one side of the hyper-edge, whereby said property of being permeable is interpreted by the WFMS at run time when executing said process model to pass control along a control flow intersecting said hyper-edge from said one side through a corresponding hyper-edge node independent whether any other hyper-edge node is ready to proceed.

4. A process model according to claim 2 or 3, wherein both sides of said hyper-edge are associated with the property of being impermeable or being permeable.

5. A process model according to claim 2 or 3, wherein one side of said hyper-edge is associated with the property of being impermeable and the other side of said hyper-edge is associated with the property of being permeable.

6. A process model according to claim 2 or 3, wherein, if said hyper-edge is a closed hyper-edge representing a sphere, said hyper-edge node is defined as a begin-sphere node in case said intersecting control flow is targeting from the outside of said sphere to the inside of said sphere, and said hyper-edge node is defined as a end-sphere node in case said intersecting control flow is targeting from the inside of said sphere to the outside of said sphere.

7. A process model according to claim 6, wherein, if a certain activity within said sphere is not a target of a control flow, said sphere being defined by an additional begin-sphere node with an additional control connector targeting from said additional begin sphere node to said certain activity, wherein, if a certain activity within said sphere is not a source of a control flow, said sphere being defined by an additional end-sphere node with an additional control connector targeting from said additional begin sphere node to said certain activity.

8. A process model according to claim 6, wherein, whenever said process model comprises at least a third activity with an additional control flow directed from said third activity to said second activity and said additional control flow is intersecting said hyper-edge, said hyper-edge being defined by a common hyper-edge node for said control flow from the said first activity to said second activity and said control flow from said at least third activity to said second activity.

* * * * *